Figure 1:
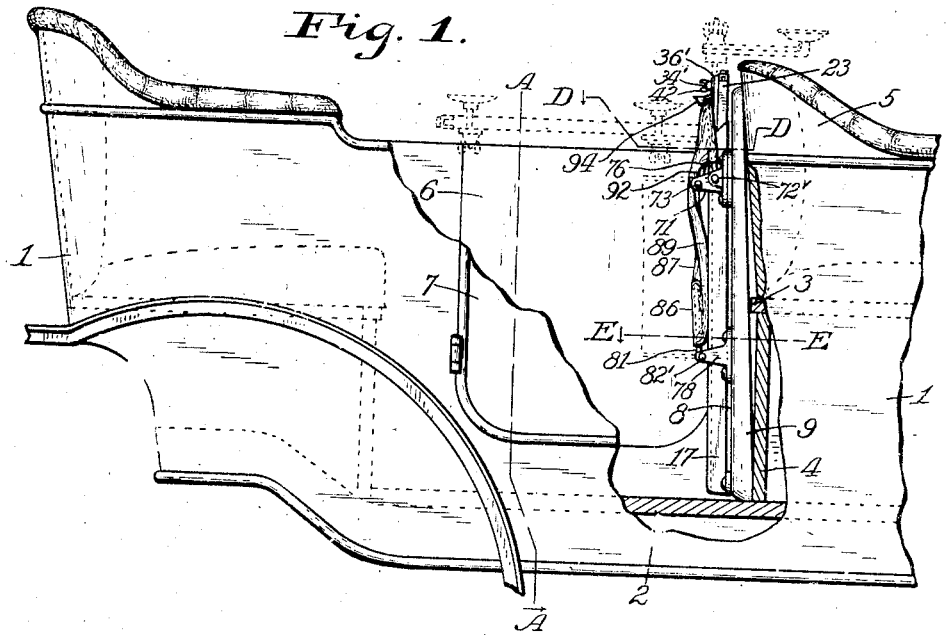

T. H. SELMAN.
AUTOMOBILE DINING TABLE AND ACCESSORIES.
APPLICATION FILED DEC. 21, 1914.

1,207,332.

Patented Dec. 5, 1916.
3 SHEETS—SHEET 1.

WITNESSES:
J. H. Gardner
M. E. Sparrow

INVENTOR:
Thomas H. Selman,
BY
E. D. Silvius,
ATTORNEY.

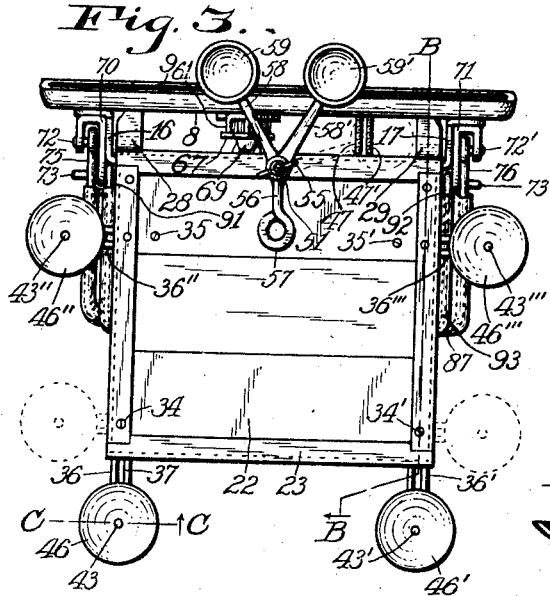
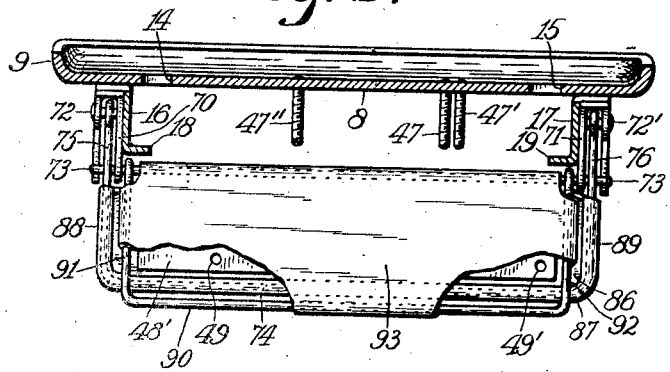
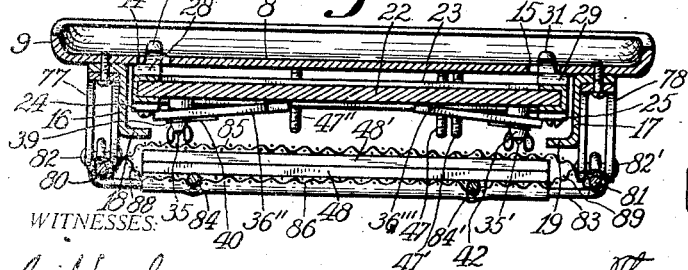
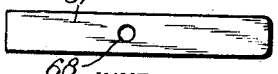

T. H. SELMAN.
AUTOMOBILE DINING TABLE AND ACCESSORIES.
APPLICATION FILED DEC. 21, 1914.
1,207,332.
Patented Dec. 5, 1916.
3 SHEETS—SHEET 3.
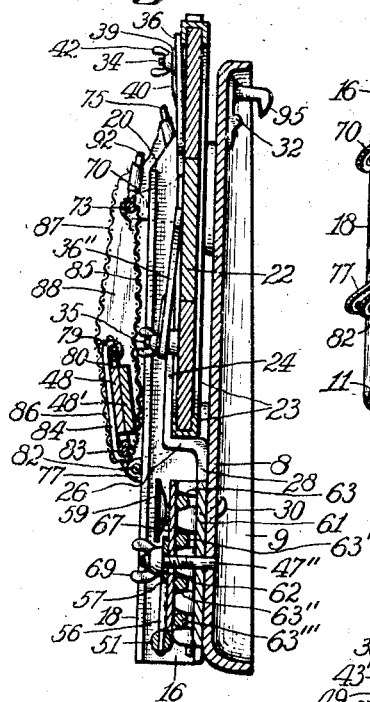
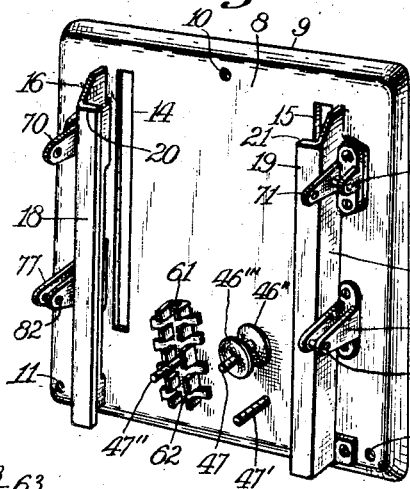
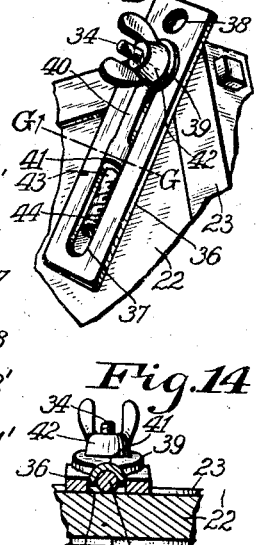
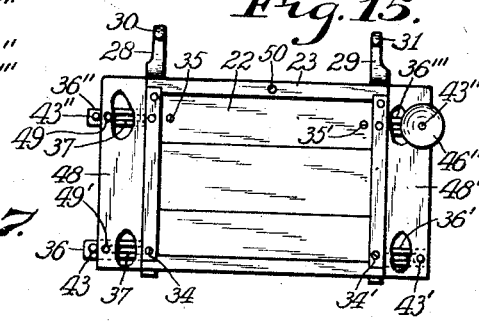
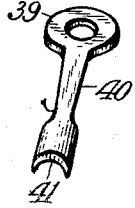
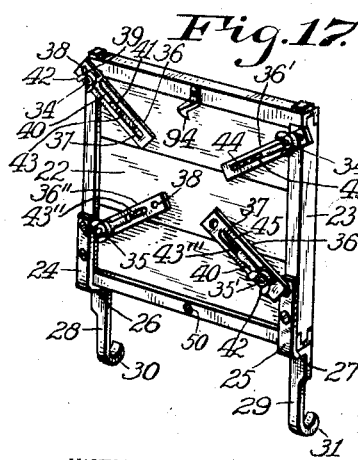
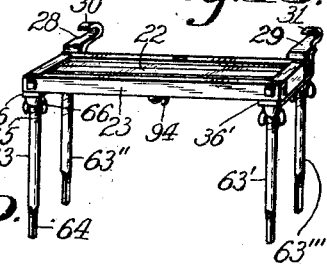
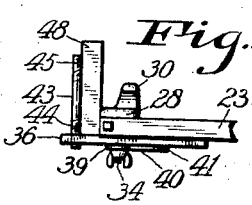
WITNESSES:
J. H. Gardner
M. E. Sparrow
INVENTOR:
Thomas H. Selman,
BY
E. T. Silvius,
ATTORNEY.

UNITED STATES PATENT OFFICE.

THOMAS H. SELMAN, OF GREENFIELD, INDIANA.

AUTOMOBILE DINING-TABLE AND ACCESSORIES.

1,207,332.　　　　Specification of Letters Patent.　　Patented Dec. 5, 1916.

Application filed December 21, 1914. Serial No. 878,362.

*To all whom it may concern:*

Be it known that I, THOMAS H. SELMAN, a citizen of the United States, residing at Greenfield, in the county of Hancock and State of Indiana, have invented a new and useful Automobile Dining-Table and Accessories, of which the following is a specification, reference being had to the accompanying drawings and to the letters and figures of reference marked thereon.

This invention relates to equipment for vehicles, more particularly automobiles, for carrying provisions or various articles and comprising a convenient dining table and accessories for the use of persons who may be touring, camping, or resting by the wayside, the invention having reference more particularly to a combination of articles compactly connected together and adapted to be secured to an automobile in convenient arrangement so as to be readily available for use, especially in emergency.

An object of the invention is to provide improved appliances adapted for the above-mentioned purposes which shall be so constructed as to be adapted to be either permanently or temporarily connected to an automobile body, so as to be conveniently and securely carried thereby when not in use and be firmly supported by the body for use. while permitting the use of the dining table and parts of the appliances independently of the automobile.

Another object of the invention is to provide an improved foundation frame or member that shall be adapted for conveniently carrying equipment of the above-mentioned character, and be adapted to be readily secured to an automobile or other vehicle body, especially at the back of the forward seat of such automobiles as have front and rear seats and so as to be available for use by occupants of both seats.

A still further object is to provide an automobile dining table and accessories of simple and inexpensive construction and which shall be available for carrying articles or parcels conveniently but without discommoding the occupants of the automobile, and which will be durable and economical in use.

With the above-mentioned and other objects in view, the invention consists in an automobile body provided with a folding dining table and diners' accessories and also a folding receptacle for articles, the table being adaptable for carrying parcels, or babies in comfortable reclining position.

The invention consists also further in the novel parts, and in the combinations and arrangements of parts or devices, as hereinafter particularly described and further defined in the accompanying claims.

Figure 2:
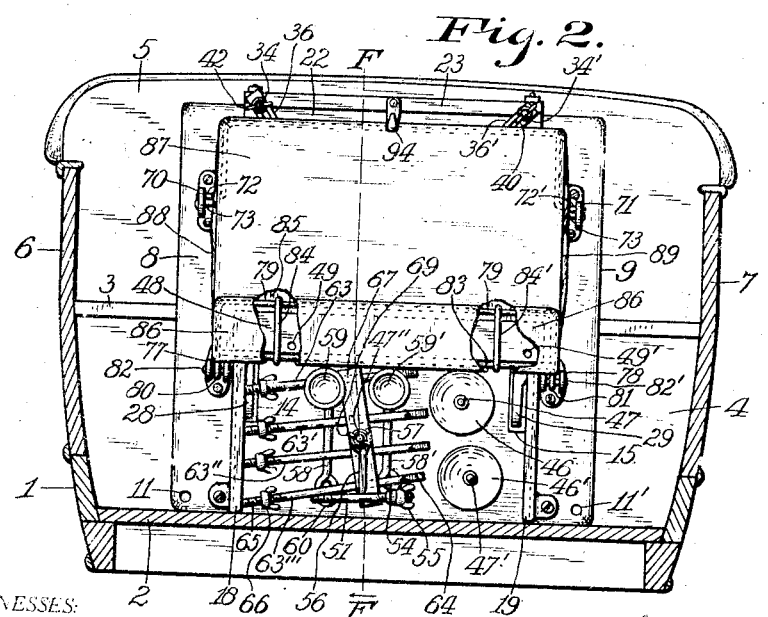

Referring to the drawings, Figure 1 is a fragmentary side elevation of an automobile body of the touring type partially broken away and provided with the invention in folded relation; Fig. 2 is a section of the body approximately on the line A A on Fig. 1 and an elevation of the folded appliances, portions thereof being broken away; Fig. 3 is a top plan of the invention arranged for use; Fig. 4 is a vertical section approximately on the line B B on Fig. 3, parts of the invention being omitted; Fig. 5 is a fragmentary section on the line C C on Fig. 3; Fig. 6 is a fragmentary horizontal section approximately on the line D D on Fig. 1 omitting the table, the carrying receptacle being unfolded and in position for use; Fig. 7 is a perspective view of one of the parts of the invention; Fig. 8 is a fragmentary horizontal section approximately on the line E E on Fig. 1; Fig. 9 is a perspective view of one of the parts of the invention; Fig. 10 is a plan of a clamp plate for securing parts of the invention to the foundation element; Fig. 11 is a fragmentary vertical section approximately on the line F F on Fig. 2; Fig. 12 is a perspective view of the base or foundation element and various parts connected thereto; Fig. 13 is a fragmentary perspective view of the table having various parts of the invention thereon; Fig. 14 is a section on the line G G on Fig. 13; Fig. 15 is a top plan of the dining table provided with extensions partially broken away; Fig. 16 is a perspective view of one of the devices comprised in the invention; Fig. 17 is a rear perspective view of the dining table having certain accessories thereon; Fig. 18 is a fragmentary front end view of the dining table having an extension and also a plate thereon; Fig. 19 is a perspective view of the table provided with removable legs so as to be adapted for use on the ground; and, Fig. 20 is a fragmentary front view of the dining table provided with a side board for retaining parcels thereon.

Similar reference characters on the different figures of the drawings indicate corresponding elements or features of construction herein referred to in detail.

In the drawings, the numeral 1 indicates a side wall and 2 the floor of a vehicle body having a front or operator's seat 3, a partition panel 4 extending from the floor upward to the seat, the seat having a back 5. The automobile body is provided with side doors 6 and 7 rearward of the seat back for the use of the passengers who may occupy the seating-space rearward of the driver's seat.

The invention includes a base or foundation which in new automobiles may be adapted to constitute the back of the front seat or seats, but for application of the invention to existing automobiles a separate base plate or board 8 is provided which may in some cases be metallic and provided with a marginal base flange 9 adapted to fit or be fitted to the seat back or panelings at the rear of the forward seat, the base or foundation having suitable holes 10, 11, 11', to receive securing screws 12, 13.

For the purpose of adjustably connecting the improved dining table to the base member, the member being normally in approximately upright position on the back of the front seat is provided with two vertical guide slots 14 and 15 and also two frame plates 16 and 17, the latter being in vertical arrangement on the front of the base 8 adjacent to the outer sides of the guide slots. The plates have guide bars 18 and 19 thereon that extend each toward the other opposite to the front of the base and partly across the guide slots. The tops of the guide bars are suitably shaped to constitute supports 20 and 21 for the dining table to rest upon.

The dining table comprises a top or table proper 22 having a strengthening frame 23 which is suitably built up, preferably of sections of metal. The table is provided with means for detachably connecting it to the base 8, said means preferably comprising two base plates 24 and 25 that are secured to the under side of the rear edge portion of the table frame and having angle portions 26 and 27 respectively that extend against and are secured to the rear edge of the frame, and two arms 28 and 29 that extend from the angle portions respectively into the guide slots 14 and 15 respectively, the arms being provided with hook-shaped lugs 30 and 31 respectively that are adapted to engage rounded reinforcing blocks 32 and 33 with which the back of the base 8 is provided at the upper ends of the slots 14 and 15, respectively, when the table is horizontally arranged for use and resting upon the supports 20 and 21, the guide-bars 18 and 19 supported by their frame plates serving as table legs. The arms are adapted to slide downward in the guide slots when the table is tilted on its supports to upright position and lowered between the frame plates 16 and 17 and behind the guide-bars 18 and 19 to folded position so as to be unobstructive when not in use. The normal under side of the table frame 23 is provided near its forward edge with two bolts 34 and 34', and the table top 22 is provided on the under side of the rear portion thereof with bolts 35 and 35'. Four adjustable arms 36, 36', 36'', 36''', are provided that are arranged on the under side of the table and adapted for performing various functions, each arm being composed of a metallic plate and having a longitudinal slot 37 therein and also a screw-threaded hole 38 in one end portion adjacent to one end of the slot, said slots receiving the bolts so that each bolt has an arm adjustably connected thereto. Four washers 39 are provided, one for each bolt, and placed on the bolt against the front of the arm, each washer having a spring tongue 40 thereon provided on its end with a clamping portion 41 that is curved transversely and enters the slot in the arm, the under side of the end portion being concave transversely. Each bolt 34 is provided with a wing nut 42 that is normally seated on the washer and when slackened permits the clamping portion 41 of the tongue to be carried out of the slot.

A suitable number of standards 43, 43', 43'', 43''', are provided to be used for various purposes and are carried when not in use in the slots of the arms and held against the under side of the table by the clamping portions 41 of the spring tongues, the arms being secured in position by the wing nuts substantially as shown in Fig. 17. Each standard is provided on one end portion with screw-threads 44 and on the opposite end portion with screw-threads 45. One end portion of the standard may be screwed into the socket hole 38, the opposite end portion being adapted to support either one of a plurality of dining plates 46, 46', 46'', 46''', each plate preferably being dished or saucer-shaped and having a suitable screw-threaded central aperture adapted to receive the upper screw-threaded portion of the standard. The plates are designed to support food for the diners and may be suitably covered, as by means of suitable paper plates or dishes if desired. The lower portion of the base 8 is provided with screw-threaded studs 47 and 47' on which the plates are screwed to be carried when not in use. The lower portion of the base is provided also with a screw-threaded stud 47'' for a purpose which will hereinafter appear.

Two extension sections 48 and 48' for the table are provided which are designed to perform several functions, each section having two apertures 49 and 49' near one edge thereof to receive the standards in some cases. The sections may be arranged on the extended arms of the table adjacent to the two opposite sides thereof and held tightly against the table by means of the standards when the arms are properly adjusted, in either one or both of the arrangements illustrated in Fig. 15 or as illustrated in Fig. 18 for increasing the available area of the top of the table; or the sections may be set up edgewise and secured in position as illustrated in Fig. 20 for retaining articles or packages on the table when traveling on the road.

For the accommodation of the occupant or occupants of the front seat of the automobile when dining, the rear portion of the frame 23 of the table is provided with a suitable socket 50, and a post 51 is provided which has screw-threads 52 adapted to be screwed into the socket, the upper portion of the post also having screw-threads 53 on which nuts 54 and 55 are placed. An arm 56 is connected to the middle portion of the post, being preferably swiveled and having a ring 57 thereon designed for holding a bottle or other article above the table. Two arms 58 and 58' are provided, each of which has a dining plate 59 or 59' fixedly secured thereon and also has an eye 60 adapted to receive the post and is placed between the two nuts 54 and 55, one eye above the other and adjustably secured by the nuts so that the arms may be arranged either above the table if preferred or so as to extend over the top of the seat back. When the arms are disconnected from the post the latter is carried on the stud 47' which extends through the ring 57.

A suitable rack 61 is provided which is placed on the stud 47'' against the front of the base 8 and it has a suitable number of recesses 62 in its front that receive attachable table legs 63, 63', 63'', 63''', for carrying the legs when not in use. One end portion of each leg has a flattened or squared portion 64 adapted to be engaged by a wrench for turning the leg, the opposite end portion of the leg having screw-threads 65 adapted to be entered in the socket holes 38 of the adjustable arms of the table, there being a nut 66 on each of the threaded portions for engaging the arm so as to tighten and lock the leg securely to the arm in order that the table when disconnected from the base 8 may be used on the ground or elsewhere, particularly when a party is camping in the woods. A clamp plate 67 having a bolt hole 68 is provided and is placed on the stud 47'' and against the attachable legs when the latter are placed in the carrying rack, after which the arm 56 of the post is placed upon the clamp plate and a nut 69 placed on the stud 47'' against the eye 57. When arranging the devices to be carried, the arms 58 and 58' are placed against the front of the base 8, after which a number of attachable legs are placed against the arms to secure the latter in position, as shown in Fig. 2.

For the purpose of carrying provisions or luncheon a foldable receptacle is provided and conveniently supported by means of brackets, there being two main brackets 70 and 71 secured to the upper portion of the base 8 on the outer sides respectively of the guide-bars 18 and 19, the brackets being provided near their bases with pivots 72 and 72' respectively. A top rod 73 is connected to the end portion of the brackets and extends beyond the outer sides thereof. A top frame is provided which comprises a cross-bar 74 having two arms 75 and 76 that are connected to the pivots 72 and 72' and extend over the rod 73 for support or to be lifted upward therefrom for folding the receptacle. Two bottom brackets 77 and 78 are secured to the base 8 below the main brackets. A bottom frame is provided which comprises a cross-bar 79 connected to two arms 80 and 81 that are connected to swing on pivots 82 and 82' supported by the bottom brackets, a cross-bar 83 being connected also to the arms. Preferably two stay bars 84 and 84' are connected to the cross-bars 79 and 83 whereby to support the two extension sections 48 and 48' to serve as a solid bottom for the receptacle, the body portion of the receptacle being composed of suitable fabric formed to constitute a back 85 connected to the rod 73 and the cross-bar 83, the fabric extending to the cross-bar 79 to form a bottom portion 86 and also extending upward to the cross-bar 74 to form a front portion 87, end portions 88 and 89 being connected to the front side portions and also to the bottom portions and to the arms 75 and 76. A cover frame is provided which comprises a cross-bar 90 and two arms 91 and 92 connected thereto that are connected for pivotal movement to the rod 73 between the main brackets so that the frame may rest upon the front bar 74 of the top frame of the receptacle, suitable fabric 93 being connected to the cover frame and also to the rod 73 to constitute a cover for the receptacle. The under side of the forward portion of the table is provided with a spring-catch 94 for engagement with the cross-bar 74 when the receptacle is folded up for the purpose of holding the receptacle in folded position.

In some cases the rear side of the upper portion of the base 8 may be provided with a suitable hook or lug 95 whereby in some cases the base may be connected to the back of the front seat of the automobile so as to be readily disconnected therefrom.

Various modifications as to minor details may be made within the scope of the appended claims, the construction shown and specifically described not being arbitrary but rather to illustrate one form of carrying out the objects of the invention.

In practical use the table is arranged horizontally so as to be readily accessible to the occupants of the rear seat of the vehicle and also to others who may be in side doorways or on the running boards of the automobile. The dining plates may be conveniently arranged so as to not occupy space upon the table, and in some cases the extension sections may be applied to the side portions of the table if desired. In some cases the attachable legs may be connected to the forward portion of the table for firm support thereof in case the table is heavily loaded. In some cases the table may be removed from its supporting base and provided with attachable legs and used remote from the automobile. When the table is not in use the arms 28 and 29 thereof are permitted to slide down the guide slots in the base while the table is lowered behind the guide-bars 18 and 19, the accessories having been placed in position to be carried substantially as shown more particularly in Figs. 2 and 17. The provisions or other articles may be readily removed from the receptacle after lifting the lid thereof upward, and in case the receptacle is empty it may be folded upward and secured so as to not be obstructive. In some cases the extension sections of the table may be used as side boards so that baggage or packages may be carried upon the table when in horizontal position, or a baby may be comfortably arranged upon the table. It will be understood also that in some cases the luncheon may be eaten while the automobile is run slowly if desired to save time.

Having thus described the invention, what is claimed as new is—

1. An automobile dining table including a base, a table connected to the base in horizontal arrangement and provided on the normal under side thereof with a plurality of arms having each a screw-threaded hole therein, the arms being adjustably secured to the table to be projected therefrom, a plurality of standards having screw-threaded end portions to be removably secured in the holes of the arms in upright position, and an extension section for the table to be supported upon the arms in either horizontal or edgewise arrangement between the standards and the adjacent edge of the table.

2. An automobile dining table including a base, a table connected to the base in horizontal arrangement and provided on the normal under side thereof with a plurality of binding bolts, a plurality of arms on the under side of the table having slots receiving the respective bolts, the arms being longitudinally projectable and having each a socket in its outer portion, a plurality of standards insertible in the sockets, an extension section for the table to be supported horizontally upon the arms against the adjacent edge of the table and having holes therein to receive the standards, and nuts on the binding bolts for securing the arms to the table in adjusted position to hold the extension tightly to the table.

3. An automobile dining table including a base normally supported uprightly and having a plurality of vertical guide slots therein, the back of the base having reinforcing blocks thereon at the upper ends of the slots, two frame plates secured to the front of the base adjacent to the outer portions of the slots and having guide bars thereon that extend each toward the other and opposite to the slots, the guide bars being constructed to constitute supporting legs for a table, and a table having arms thereon that extend movably into the slots, the arms being provided with lugs for engaging the reinforcing blocks when the table is in horizontal position, the table being movable either onto the tops of the guide bars for horizontal support or into vertical position behind the guide bars and between the frame plates.

4. An automobile dining table and accessories including a base, a table connected to the base in horizontal arrangement and provided with a plurality of bolts, a plurality of horizontal arms having slots receiving the respective bolts and adjustably arranged against the table, each arm having a screw-threaded hole therein, a plurality of nuts on the bolts respectively, a plurality of standards provided on opposite end portions thereof with screw threads, one end portion of the standards being adapted to be inserted in the screw-threaded hole for support, each standard being insertible in the slot of either one of the arms, a plurality of washers on the respective bolts between the arm and the nut and having each a tongue thereon for holding the standard in the slot and against the table, and a plurality of plates adapted to be screwed onto the opposite end of either one of the standards.

5. An automobile dining table including a base normally supported uprightly and having a plurality of vertical slots therein, the front of the base having a pair of vertical guide bars thereon and constructed to constitute supporting legs, a table movable horizontally onto the supporting legs and having arms thereon that are insertible into the slots and provided with lugs for engagement with the base at the tops of the slots, the table being portable to be moved away from the bars.

6. In an automobile dining table, the combination of a normally upright base having vertical guideways and also projections provided with guide bars forward of the guideways, and a table having arms slidingly guided in the guideways, the table being movable onto the tops of the guide bars for support and the arms having lugs to engage the back of the base at the tops of the guideways to hold the table on the guide bars, the table being movable to upright position behind the guide bars.

7. In an automobile dining table and accessories, the combination of a table, a plurality of arms adjustably connected to the normal under side of the table to be projected beyond the edge of the table, each arm having a screw-threaded hole, a table section to be supported upon the arms against the edge of the table and having apertures therein, standards to be screwed into said holes through said apertures, and plates to be secured upon said standards.

8. In an automobile dining table and accessories, the combination of a supporting-standard having screw-threaded ends, a table having a screw-threaded hole receiving one of said ends, an arm connected to said standard and having a ring fixed on its end, a thumb-nut on the opposite end portion of said standard, a collar adjustable on said standard between said arm and said thumb-nut, and a plurality of arms having each an eye connected to said standard between said collar and said thumb-nut, each arm having a dining-plate fixed thereon.

9. In an automobile dining table and accessories, the combination of a table having securing-bolts on the normal under side thereof, arms connected to the bolts and having each a longitudinal slot to receive dining-plate standards, and washers connected to the securing-bolts respectively and having each a tongue thereon to clamp the standard in the slot against the table.

In testimony whereof, I affix my signature in presence of two witnesses.

THOMAS H. SELMAN.

Witnesses:
HORACE K. BOYD,
WILLIAM B. BOTTSFORD.